United States Patent
Ujii et al.

(10) Patent No.: US 11,899,564 B2
(45) Date of Patent: Feb. 13, 2024

(54) DEBUG APPARATUS AND RECORDING MEDIUM

(71) Applicant: RENESAS ELECTRONICS CORPORATION, Tokyo (JP)

(72) Inventors: Tomoyoshi Ujii, Tokyo (JP); Yuki Mori, Tokyo (JP); Kazunori Ochiai, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 76 days.

(21) Appl. No.: 17/748,738

(22) Filed: May 19, 2022

(65) Prior Publication Data
US 2023/0376402 A1 Nov. 23, 2023

(51) Int. Cl.
*G06F 11/36* (2006.01)
*G06F 1/20* (2006.01)

(52) U.S. Cl.
CPC ............ *G06F 11/366* (2013.01); *G06F 1/206* (2013.01)

(58) Field of Classification Search
CPC ................................ G06F 11/366; G06F 1/206
See application file for complete search history.

(56) References Cited

U.S. PATENT DOCUMENTS

| | | | |
|---|---|---|---|
| 2006/0095911 A1* | 5/2006 | Uemura | G06F 9/5027 718/100 |
| 2010/0153786 A1 | 6/2010 | Matsukawa | |
| 2010/0175051 A1* | 7/2010 | Tanabe | G06F 11/362 717/124 |
| 2011/0231860 A1* | 9/2011 | Kazama | G06F 9/5094 718/105 |
| 2015/0241854 A1* | 8/2015 | Tsuda | G06F 11/004 700/299 |
| 2015/0256421 A1* | 9/2015 | Kawai | H04L 43/16 709/224 |
| 2018/0095441 A1* | 4/2018 | Nakagawa | G05B 19/052 |
| 2020/0209929 A1* | 7/2020 | Gomi | G06F 1/324 |
| 2021/0144517 A1* | 5/2021 | Guim Bernat | H04L 67/10 |

FOREIGN PATENT DOCUMENTS

JP 2010-140240 A 6/2010

* cited by examiner

*Primary Examiner* — Matthew M Kim
*Assistant Examiner* — Indranil Chowdhury
(74) *Attorney, Agent, or Firm* — Rimon P.C.; Tomoki Tanida (57) ABSTRACT

A debug apparatus for performing allocation of target programs in which temperature is uniformized is provided. The debug apparatus receives temperature data measured by temperature sensors from a semiconductor device. The debug apparatus determines, as an analysis result of the temperature data, a CPU where the number of target programs executed is to be decreased and a CPU where the number of target programs executed is to be increased. The debug apparatus changes allocation of the target programs executed by a plurality of CPUs in the semiconductor device based on the analysis result of the temperature data.

17 Claims, 7 Drawing Sheets

| SENSOR | t1 | t2 | t3 | t4 | AVERAGE | CPU |
|---|---|---|---|---|---|---|
| 281 | 22.9 | 41.0 | 40.3 | 38.8 | 35.8 | 211, 212 |
| 282 | 10.3 | 11.2 | 30.8 | 31.9 | 21.1 | 211, 214 |
| 283 | 11.8 | 10.7 | 17.9 | 20.5 | 15.2 | 214, 215 |
| 284 | 40.3 | 40.0 | 39.7 | 36.9 | 39.2 | 212, 213 |
| 285 | 12.7 | 13.9 | 18.8 | 20.1 | 16.4 | 213, 216 |
| 286 | 15.0 | 13.5 | 15.9 | 17.8 | 15.6 | 215, 216 |

DEBUG APPARATUS AND RECORDING MEDIUM

BACKGROUND

The present disclosure relates to a debug apparatus and a recording medium.

With the progress of autonomous driving, electrification, and connected technology, electric/electronic (E/E) architecture of automobiles is becoming more complex and advanced. In the E/E architecture of the automobiles, many electronic control units (ECUs) operate in complex coordination. A plurality of central processing units (CPUs) is mounted on a semiconductor device constituting the ECU. Programs are allocated to each CPU, and each CPU executes the allocated programs.

In the semiconductor device constituting the ECU, the circuit in the semiconductor device operates by executing the programs allocated to each CPU. When the circuit in the semiconductor device operates, the semiconductor device generates heat. In order to suppress the heat generation of the semiconductor device, thermal countermeasures by heat sinks, fans, etc. are required.

In a semiconductor device on which a plurality of CPUs is mounted, if programs executed by the CPUs are allocated randomly, the processing load is biased among the CPUs. When the processing load is concentrated on a specific CPU, the temperature of the semiconductor device rises. The rise in the temperature of the semiconductor device requires reconsideration of the thermal countermeasures, such as the enlargement of the heat sink and the addition of fans, leading to an increase in the manufacturing cost. Therefore, it is desirable to make the processing load of the CPU as uniform as possible.

Further, programs are allocated to each CPU using a general debugging technique.

There is a disclosed technique listed below.

[Patent Document 1] Japanese Unexamined Patent Application Publication No. 2010-140240

For example, Patent Document 1 is an example of a general debugging technique. A user allocates programs to each CPU and acquires processing load information of each CPU. Based on the acquired processing load information, when the concentrated processing load to the specific CPU is confirmed, the user revises the allocation of the programs to each CPU. By repeating this work, the allocation of the programs is determined so that the processing load of the CPU is uniformized. As described above, conventionally, the allocation of the programs to each CPU is determined on the assumption that uniformizing the processing load of the CPU results in uniformizing the temperature of the semiconductor device.

SUMMARY

However, in the semiconductor device, since various functional circuits and memories operate by the processing of the CPU, the temperature of the entire semiconductor device is not determined only by the processing load of the CPU. Therefore, in the conventional method, in order to achieve true temperature uniformity, it is necessary to allocate the programs to each CPU after grasping the structure and operation of the entire semiconductor device, but the work is not easy.

Other objects and novel features will be apparent from the description of this specification and the accompanying drawings.

A debug apparatus according to an embodiment receives temperature data measured by temperature sensors from a semiconductor device. The debug apparatus determines, as an analysis result of the temperature data, a CPU where the number of target programs executed is to be decreased and a CPU where the number of target programs executed is to be increased. The debug apparatus changes allocation of the target programs executed by a plurality of CPUs in the semiconductor device based on the analysis result of the temperature data.

According to the embodiment, the allocation of the target programs is changed based on the measurement result of the actual temperature. Therefore, it is possible to easily realize the allocation of the target programs in which the temperature is uniformized, as compared with the conventional method, and as a result, it is possible to suppress the increase of the manufacturing cost.

DETAILED DESCRIPTION

Hereinafter, embodiments will be described in detail with reference to the drawings. In the specification and the drawings, the same or corresponding components are denoted by the same reference numerals, and a repetitive description thereof is omitted. In the drawings, for convenience of description, the configuration may be omitted or simplified.

Figure 1:
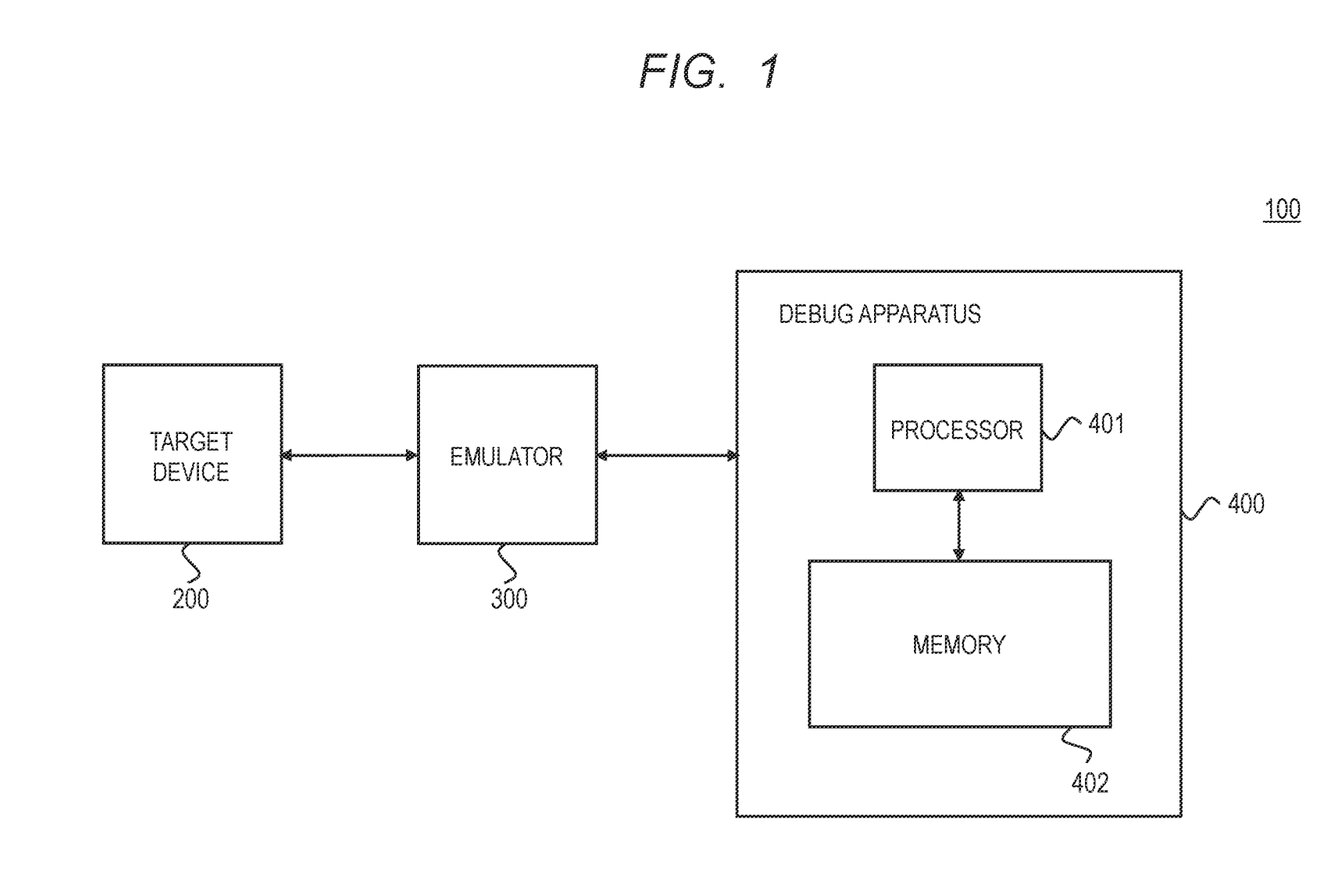
FIG. 1 is a block diagram showing an example of a configuration of a debugging system according to an embodiment.

FIG. 1 is a block diagram showing an example of a configuration of a debug system 100 according to the embodiment. As shown in FIG. 1, the debug system 100 includes a target device 200, an emulator 300, and a debug apparatus 400.

The target device 200 is a semiconductor device on which a plurality of CPUs is mounted. The plurality of CPUs executes a plurality of programs to be debugged. Hereinafter, the programs to be debugged including a plurality of programs is referred to as target programs. The emulator 300 connects the target device 200 to the debug apparatus 400 using an Ethernet (registered trademark) or a universal serial bus (USB). The debug apparatus 400 operates in conjunction with the emulator 300 to control the execution of the target programs operating on the target device 200 and to read the values of the registers in the target device 200.

The debug apparatus 400 is, for example, a personal computer and includes a processor 401 and a memory 402.

The memory 402 is, for example, a static random access memory (SRAM). The processor 401 is connected to the memory 402 via a bus.

The memory 402 stores a control program for supporting debugging work for the target programs and determining allocation of the target programs to the CPUs in the target device 200. Further, the memory 402 stores various data used in determining the allocation of the target programs. The processor 401 reads the control program stored in the memory 402 and executes the read control program.

Although the debug apparatus 400 is connected to the target device 200 via the emulator 300 in FIG. 1, the debug apparatus 400 may be directly connected to the target device 200 without the emulator 300. In this case, the debug apparatus 400 is configured to include the functions of the emulator 300.

Figure 2:
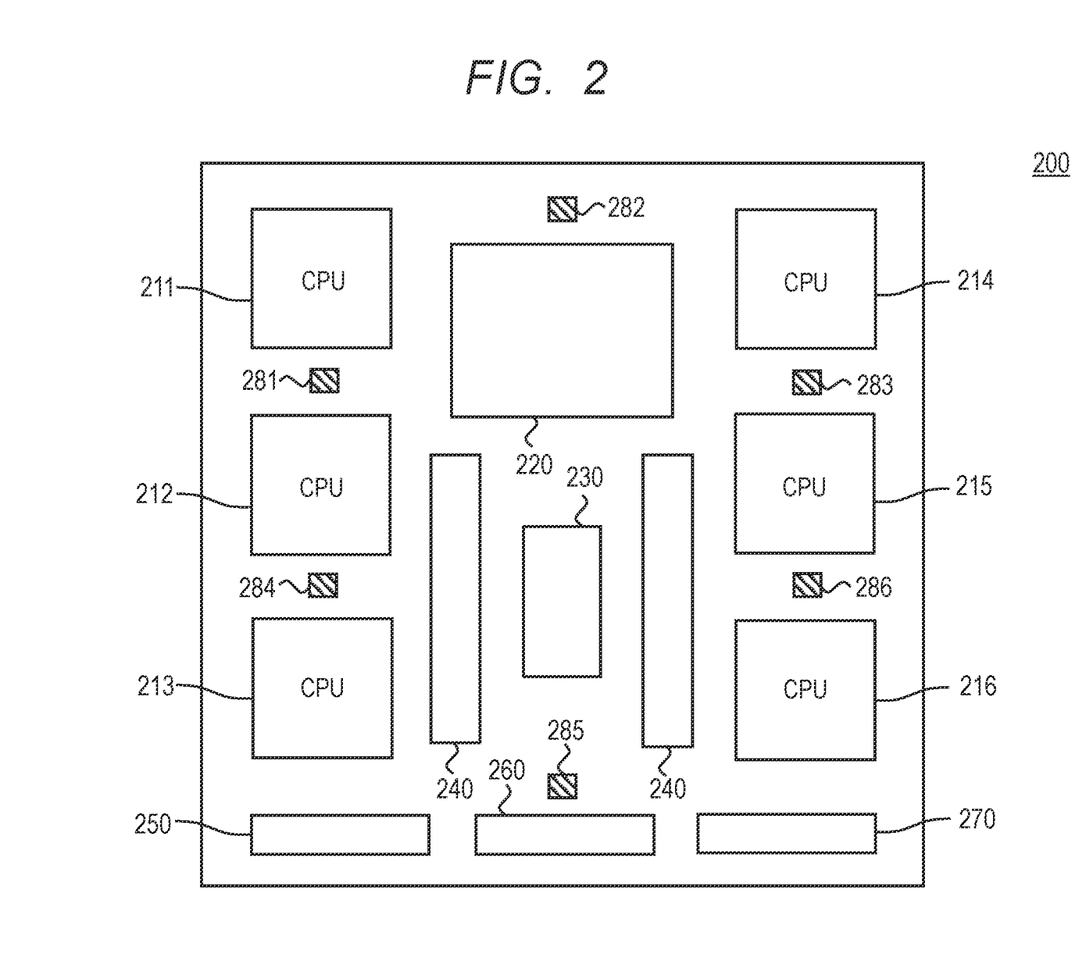
FIG. 2 is a plan view showing an example of the layout of the target device according to the embodiment.

FIG. 2 is a plan view showing an example of a layout of the target device 200 according to the embodiment. As shown in FIG. 2, the target device 200 includes CPUs 211 to 216, a peripheral circuit 220, a power management circuit 230, an internal memory 240, a communication interface (IF) circuit 250, an external memory IF circuit 260, a debug IF circuit 270, and temperature sensors 281 to 286.

The internal memory 240 is, for example, an SRAM and stores the target programs. The target programs include a plurality of programs executed by each of the CPUs 211 to 216. The target programs are stored in internal memory 240 in the form of a load module corresponding to each of the CPUs 211 to 216. That is, six load modules executed by the CPUs 211 to 216 are stored in the internal memory 240. Each of the CPUs 211 to 216 reads the target programs in the load module format allocated to itself from the internal memory 240 and executes the read target programs.

Further, the types of CPUs 211 to 216 may be different. When the types of CPUs 211 to 216 differ, the target programs executed by each of the CPUs 211 to 216 are compiled using a compiler corresponding to the type of CPU.

The peripheral circuit 220 includes a digital circuit such as a timer and an analog circuit such as an analog-to-digital converter (ADC). The power management circuit 230 manages the power supplied to the circuit blocks in the target device 200. The communication IF circuit 250 is an IF circuit for communicating with an external semiconductor device. The external memory IF circuit 260 is an IF circuit for connecting with an external memory. The debug IF circuit 270 is an IF circuit for communicating with the debug apparatus 400 via the emulator 300. These circuit blocks operate in accordance with the processing of the CPUs 211 to 216.

The temperature sensors 281 to 286 are sensors for measuring the temperature of the target device 200. Each of the temperature sensors 281 to 286 measures the temperature at a position within the target device 200 on which temperature sensor itself is arranged. As shown in FIG. 2, the temperature sensor 281 is arranged between the CPU 211 and the CPU 212. The temperature sensor 282 is arranged between the CPU 211 and the CPU 214. The temperature sensor 283 is arranged between the CPU 214 and the CPU 215. The temperature sensor 284 is arranged between the CPU 212 and the CPU 213. The temperature sensor 285 is arranged between the CPU 213 and the CPU 216. The temperature sensor 286 is arranged between the CPU 215 and the CPU 216.

For example, each of the temperature sensors 281 to 286 includes a diode and an ADC. The diode outputs a forward voltage that varies with the temperature of the target device 200. The ADC converts the analog value of the forward voltage output from the diode into a digital value. Each of the temperature sensors 281 to 286 transmits the temperature data of the digital value as a result of the temperature measurement to the debug IF circuit 270.

Figure 3:
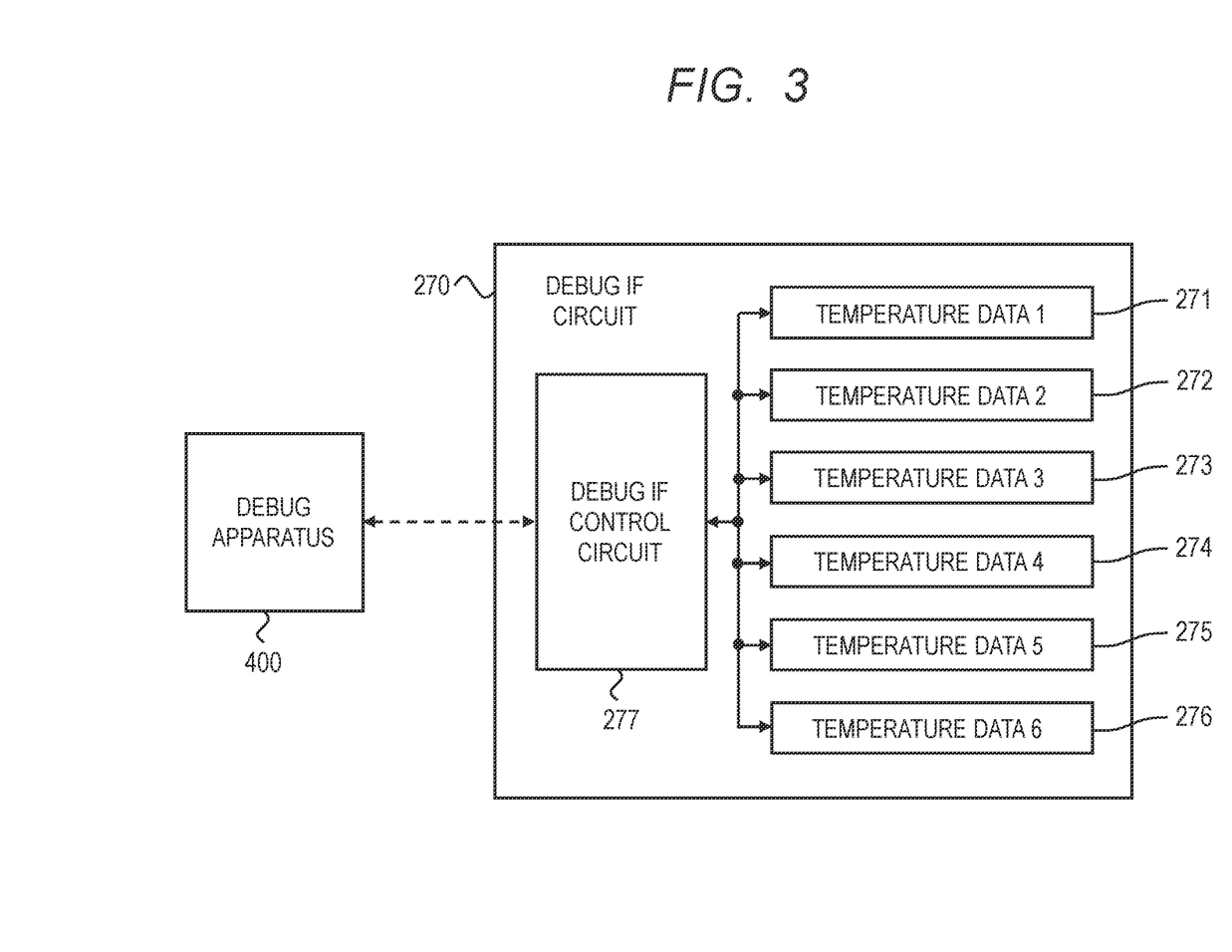
FIG. 3 is a block diagram showing an example of the configuration of the debug interface circuit according to the embodiment.

FIG. 3 is a block diagram showing an example of a configuration of the debug IF circuit 270 according to the embodiment. As shown in FIG. 3, the debug IF circuit 270 includes temperature data storage units 271 to 276 and a debug IF control circuit 277.

The debug IF control circuit 277 is connected to the temperature sensors 281 to 286. The debug IF control circuit 277 receives temperature data output from each of the temperature sensors 281 to 286. The debug control IF circuit 277 stores the temperature data output from the temperature sensors 281 to 286 in the temperature data storage units 271 to 276.

The temperature data storage units 271 to 276 are connected to the debug IF control circuit 277. The temperature data storage units 271 to 276 is provided corresponding to the temperature sensors 281 to 286. The temperature data output from the temperature sensor 281 (temperature data 1) is stored in the temperature data storage unit 271. The temperature data output from the temperature sensor 282 (temperature data 2) is stored in the temperature data storage unit 272. The temperature data output from the temperature sensor 283 (temperature data 3) is stored in the temperature data storage unit 273. The temperature data output from the temperature sensor 284 (temperature data 4) is stored in the temperature data storage unit 274. The temperature data output from the temperature sensor 285 (temperature data 5) is stored in the temperature data storage unit 275. The temperature data output from the temperature sensor 286 (temperature data 6) is stored in the temperature data storage unit 276.

Further, the debug IF control circuit 277 reads the temperature data 1 to 6 stored in the temperature data storage units 271 to 276 in response to a read instruction of the temperature data issued from the debug apparatus 400 and transmits the read temperature data 1 to 6 to the debug apparatus 400.

Although each of the temperature sensors 281 to 286 can transmit the temperature data to the debug IF circuit 270 at an arbitrary transmission period, it is preferable that the transmission period of the temperature data be shorter than the period in which the debug apparatus 400 issues a read instruction of the temperature data to the target device 200.

Figure 4:
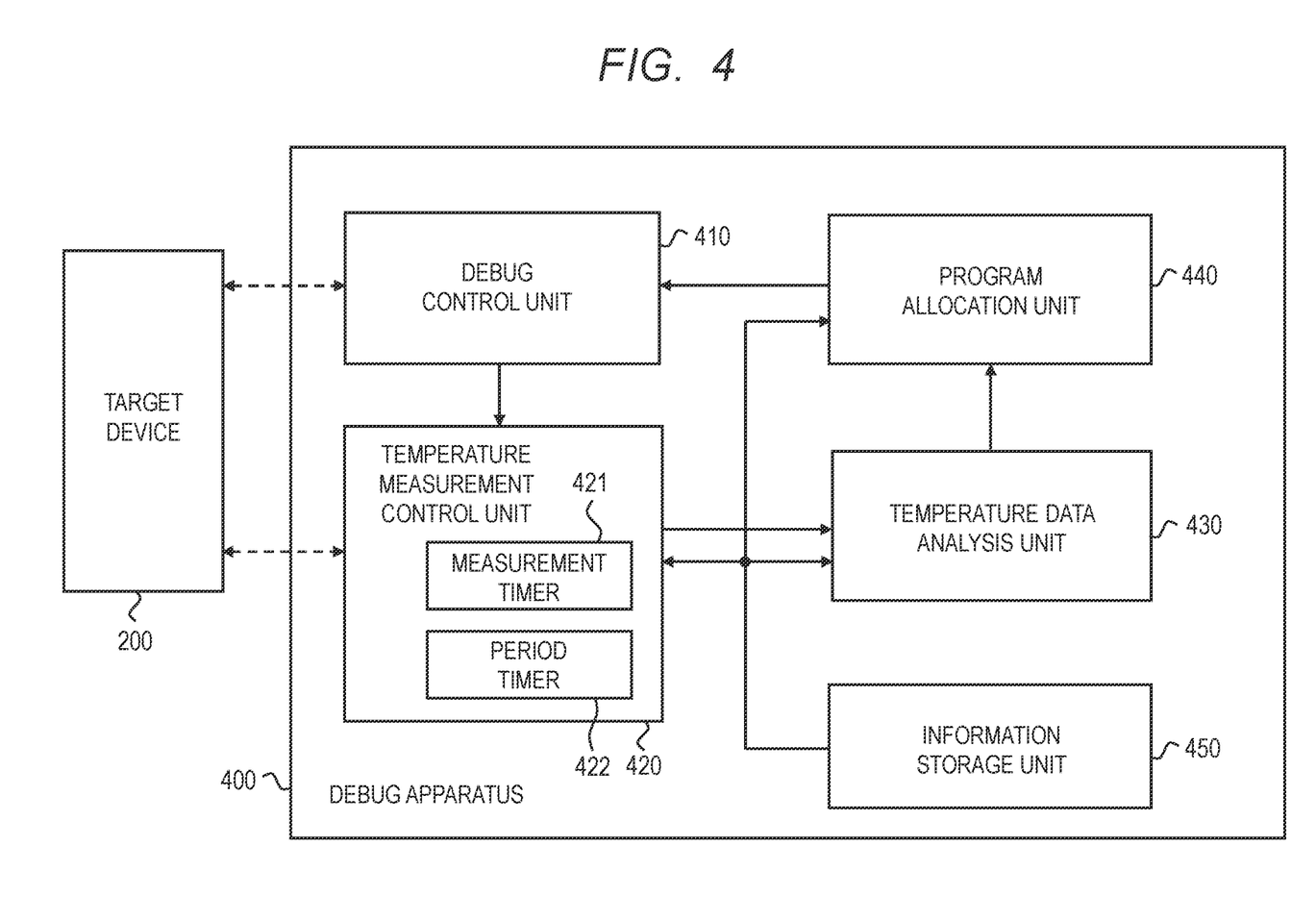
FIG. 4 is a block diagram showing an example of the function of the debugging apparatus according to the embodiment.

FIG. 4 is a block diagram showing an example of a function of the debug apparatus 400 according to the embodiment. As shown in FIG. 4, the debug apparatus 400 includes a debug control unit 410, a temperature measurement control unit 420, a temperature data analysis unit 430, a program allocation unit 440, and an information storage unit 450. The functions of the debug control unit 410, the temperature measurement control unit 420, the temperature data analysis unit 430, and the program allocation unit 440 are realized by executing the control program stored in the memory 402 by the processor 401. Further, the information storage unit 450 is configured by a part of the area of the memory 402.

The debug control unit 410 is connected to the target device 200 via the emulator 300. Further, the debug control unit 410 is connected to the temperature measurement control unit 420 and the program allocation unit 440.

The debug control unit 410 instructs the target device 200 to execute and stop the target programs. When instructing the target device 200 to execute the target programs, the debug control unit 410 outputs a program start signal indicating that the execution of the target programs has started to the temperature measurement control unit 420.

Further, the debug control unit 410 receives load modules from the program allocation unit 440. The debug control unit 410 downloads the load modules to the internal memory 240 of the target device 200.

The temperature measurement control unit 420 is connected to the target device 200 via the emulator 300. Further, the temperature measurement control unit 420 is connected to the debug control unit 410, the temperature data analysis unit 430 and the information storage unit 450.

The temperature measurement control unit 420 includes a measurement timer 421 and the period timer 422. The measurement timer 421 is a timer for counting a temperature measurement time. The period timer 422 is a timer for counting a sampling time for measuring temperature. The temperature measurement control unit 420 starts the count operation of the measurement timer 421 and the count operation of the period timer 422 in response to the program start signal output from the debug control unit 410.

The temperature measurement control unit 420 reads measurement time information and sampling time information stored in the information storage unit 450. The temperature measurement control unit 420 acquires temperature data from the target device 200 based on the count value of the measurement timer 421, the count value of the period timer 422, the measurement time information, and the sampling time information. The temperature data acquired is the temperature data 1 to 6 output from the temperature sensors 281 to 286. The temperature measurement control unit 420 outputs the acquired temperature data to the temperature data analysis unit 430.

The temperature data analysis unit 430 is connected to the temperature measurement control unit 420, the program allocation unit 440 and the information storage unit 450.

The temperature data analysis unit 430 receives temperature data from the temperature measurement control unit 420. Further, the temperature data analysis unit 430 reads device information stored in the information storage unit 450. The device information includes CPU position information and temperature sensor position information. The CPU position information is information for identifying positions of the CPUs 211 to 216 in the target device 200. The temperature sensor position information is information for identifying positions of the temperature sensors 281 to 286 in the target device 200.

The temperature data analysis unit 430 refers to the temperature data and confirms whether or not desired temperature data has been acquired. If the temperature data is not a desired value, the temperature data analysis unit 430 determines, from the CPUs 211 to 216, at least one CPU where the number of target programs executed is to be decreased and at least one CPU where the number of target programs executed is to be increased based on the temperature data, the CPU position information, and the temperature sensor position information. The temperature data analysis unit 430 outputs, to the program allocation unit 440, information on at least one CPU where the number of target programs executed is to be decreased and at least one CPU where the number of target programs executed is to be increased as an analysis result of the temperature data. Hereafter, at least one CPU where the number of target programs executed is to be decreased is referred to as a first change target CPU. Further, at least one CPU where the number of target programs executed is to be increased is referred to as a second change target CPU.

The program allocation unit 440 is connected to the debug control unit 410, the temperature data analysis unit 430, and the information storage unit 450.

The program allocation unit 440 receives an analysis result of temperature data from the temperature data analysis unit 430. Further, the program allocation unit 440 reads the device information, the target programs, and target program constraint information stored in the information storage unit 450. The device information includes CPU type information. The CPU type information is information for identifying types of the CPUs 211 to 216. The target programs include a plurality of programs executed by the CPUs 211 to 216. The target program constraint information is information used in determining whether to change allocation of the target programs executed by the CPUs 211 to 216.

The program allocation unit 440 changes allocation of the target programs executed by the CPUs 211 to 216 based on the analysis result of the temperature data, the CPU type information, and the target program constraint information. After changing the allocation of the target programs, the program allocation unit 440 generates a load module for each of the CPUs 211 to 216 by compiling the target programs whose allocation has been changed.

The program allocation unit 440 outputs the generated load modules to the debug control unit 410. Further, the program allocation unit 440 stores the target programs whose allocation to the CPUs 211 to 216 has been changed in the information storage unit 450, so that the target programs stored in the information storage unit 450 are updated to the target programs to be executed next in the target device 200.

The information storage unit 450 is connected to the temperature measurement control unit 420, the temperature data analysis unit 430 and the program allocation unit 440.

The information storage unit 450 stores the measurement time information, the sampling time information, the device information, the target programs, and the target program constraint information. The information storage unit 450 provides the measurement time information and the sampling time information to the temperature measurement control unit 420. The information storage unit 450 provides the device information to the temperature data measurement unit 430. The information storage unit 450 provides the device information, the target programs, and the target program constraint information to the program allocation unit 440.

Figure 5:
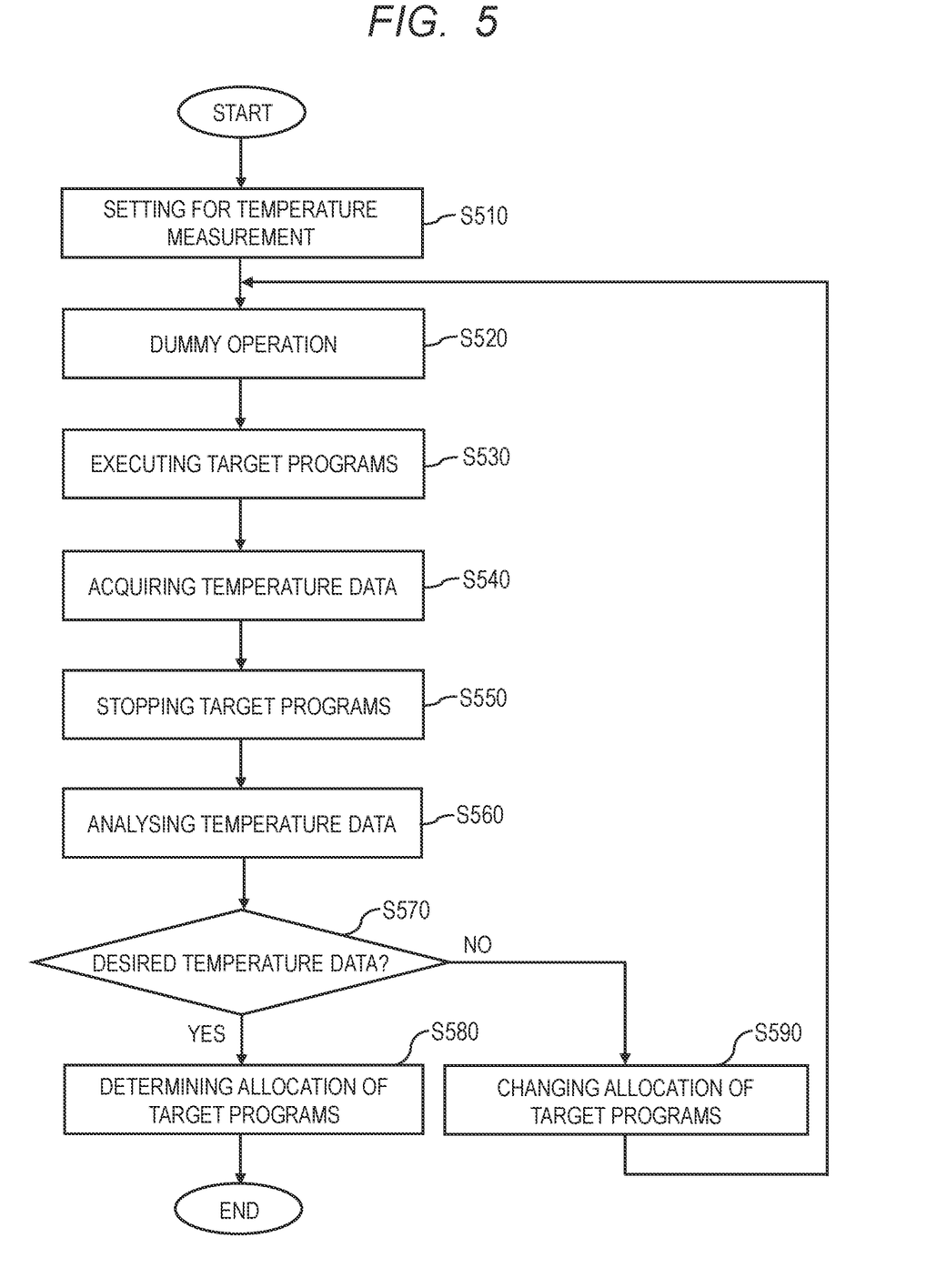
FIG. 5 is a flowchart showing an example of the operation of the debugging system according to the embodiment.

Next, an operation of the debug system 100 will be described. FIG. 5 is a flowchart showing an example of an operation of the debug system 100 according to the embodiment. The flowchart of FIG. 5 includes nine processing steps S510 to S590 First, in the step S510, processing of setting for temperature measurement is performed. The temperature measurement control unit 420 reads the measurement time information stored in the information storage unit 450 and sets the read measurement time information in the measurement timer 421. Further, the temperature measurement control unit 420 sets the sampling time information stored in the information storage unit 450 in the period timer 422.

In the step S520, processing of a dummy operation is performed. The debug control unit 410 instructs the target device 200 to execute the dummy operation in which the temperature is not measured by the temperature sensors 281 to 286. In a state in which the target device 200 is cold, the temperature of the target device 200 cannot be appropriately measured. Therefore, before executing the target programs with accompanied by the temperature measurement, the temperature of the target device 200 is appropriately warmed by causing the target device 200 to execute the dummy operation without the temperature measurement.

Each of the CPUs 211 to 216 executes the target programs stored in the internal memory 240 in response to an execution instruction of the dummy operation. Further, during that period, the temperature sensors 281 to 286 does not measure the temperature of the target device 200.

After a predetermined time has elapsed, the debug control unit 410 instructs the target device 200 to stop the dummy operation. Each of the CPUs 211 to 216 stops executing the target programs in response to a stop instruction of the dummy operation from the debug control unit 410. Further, the target device 200 initializes the state of the target device 200 using an internal reset function.

In the step S530, processing of executing the target programs is performed. The debug control unit 410 instructs the target device 200 to execute the target programs. Each of the CPUs 211 to 216 executes the target programs stored in the internal memory 240 in response to an execution instruction of the target programs from the debug control unit 410. In the target programs executed initially, the target programs executed by each of the CPUs 211 to 216 are allocated so that the amount of the programs executed by each of the CPUs 211 to 216 is approximately equal.

Further, the temperature sensors 281 to 286 start measuring the temperature in response to the execution instruction of the target programs from the debug control unit 410. During execution of the target programs, the temperature sensors 281 to 286 transmits temperature data, which is a measurement result of the temperature, to the debug IF circuit 270.

Further, the debug control unit 410 outputs a program start signal indicating that the execution of the target programs has started to the temperature measurement control unit 420.

Figure 6:
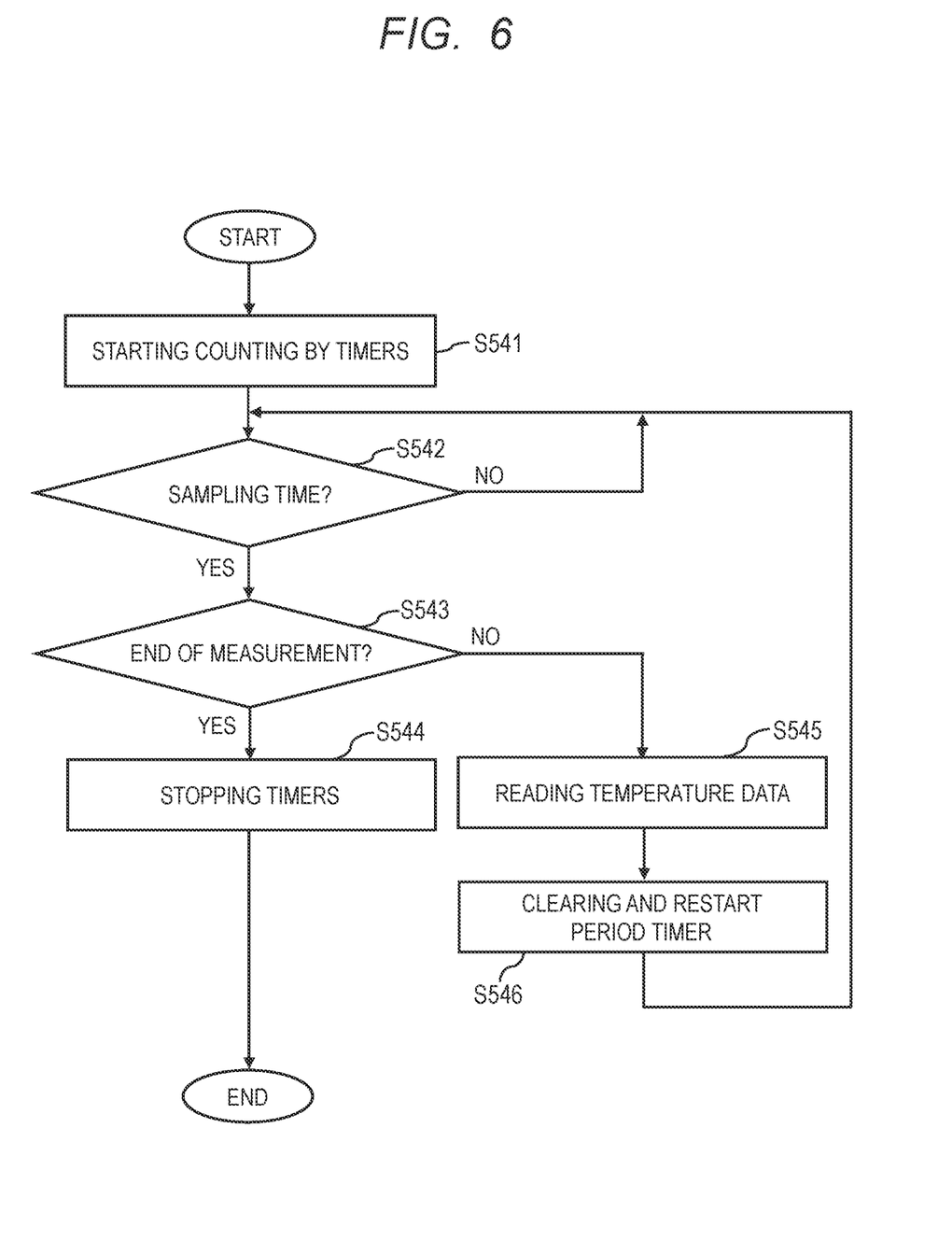
FIG. 6 is a flowchart showing an example of the process of acquiring temperature data.

In the step S540, processing of acquiring temperature data is performed. Here, the processing of acquiring the temperature data will be described in detail with reference to FIG. 6. FIG. 6 is a flowchart showing an example of processing of acquiring temperature data. The flowchart of FIG. 6 includes six processing steps S541 to S546. First, in the step S541, processing of starting counting by timers is performed. The temperature measurement control unit 420 starts the count operation of the measurement timer 421 and the count operation of the period timer 422 in response to the program start signal from the debug control unit 410.

In the step S542, the count value of the period timer 422 is compared with a value indicated by the sampling time information (sampling time). When the count value of the period timer 422 matches the sampling time (YES in the step S542), the processing proceeds to the step S543. On the other hand, if the count value of the period timer 422 does not match the sampling time (NO in the step S542), the period timer 422 continues the count operation until the count value and the sampling time match.

In the step S543, the count value of the measurement timer 421 is compared with a value indicated by the measurement time information (measurement time). When the count value of the measurement timer 421 exceeds the measurement time (YES in the step S543), the processing proceeds to the step S544. On the other hand, when the count value of the measurement timer 422 does not exceed the measurement time (NO in the step S543), the processing proceeds to the step S545.

In the step S544, processing of stopping the timers is performed. The temperature measurement control unit 420 stops the measurement timer 421 and the period timer 422. Thus, the processing of acquiring the temperature data is completed.

On the other hand, in the step S545, processing of reading the temperature data is performed. The temperature measurement control unit 420 instructs the target device 200 to read the temperature data. Upon receiving the read instruction of the temperature data, the debug IF control circuit 277 transmits the temperature data 1 to 6 stored in the temperature data storage units 271 to 276 to the debug apparatus 400.

When transmitting the temperature data 1 to 6, the debug IF control circuit 277 may transmit the temperature data 1 to 6 by associating information for identifying the temperature sensor that measured temperature data. For example, when transmitting the temperature data 1 stored in the temperature data storage unit 271, the debug IF control circuit 277 transmits the temperature data 1 in association with information for identifying the temperature sensor 281.

In the step S546, processing of clearing and restarting the period timer 422 is performed. The temperature measurement control unit 420 clears the count value of the period counter 422 to restart the count operation of the period counter 422. Thereafter, the processing returns to the step S542.

Thus, in the step S540, the temperature measurement control unit 420 measures the sampling time using the period timer 422 and acquires the temperature data from the target device 200 a plurality of times at predetermined intervals (sampling intervals). Further, the temperature measurement control unit 420 measures the measurement time using the measurement timer 421 and continues to acquire the temperature data from the target device 200 until the measurement time has elapsed.

Returning to FIG. 5, the description of the operation of the debug system 100 will be continued. Next, in the step S550, processing of stopping the target programs is performed. The debug control unit 410 instructs the target device 200 to stop the target programs. Each of the CPUs 211 to 216 stops executing the target programs in response to a stop instruction of the target programs issued from the debug control unit 410.

In the step S560, processing of analyzing temperature data is performed. The temperature data analysis unit 430 receives temperature data from the temperature measurement control unit 420. The temperature data includes six types of temperature data 1 to 6 measured by the temperature sensors 281 to 286. Further, each of the temperature data 1 to 6 includes a plurality of temperature data measured at specified sampling intervals.

Figure 7:
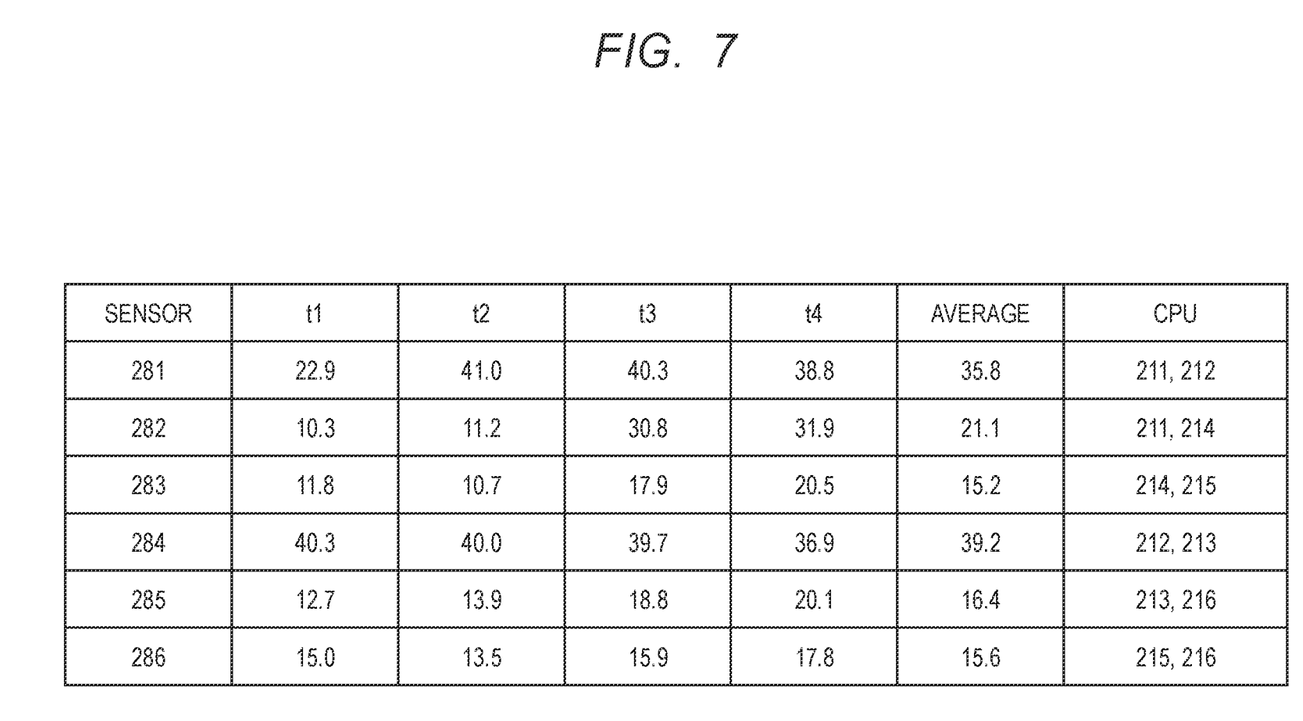
FIG. 7 is a diagram showing an example of the measurement result of the temperature data according to the embodiment.

FIG. 7 is a diagram showing an example of a measurement result of temperature data according to the embodiment. In the example shown in FIG. 7, during one measurement time, the temperature data 1 to 6 measured by the temperature sensors 281 to 286 is acquired at four timings of t1 to t4. The unit of the value of the temperature data shown in FIG. 7 is ° C.

The temperature data analysis unit 430 analyses the received temperature data. In the analysis of the temperature data, for example, an analysis technique based on an average of the temperature data can be used. As shown in FIG. 7, the temperature data analysis unit 430 calculates an average value in four measurements for each of the temperature data 1 to 6 measured by the temperature sensors 281 to 286.

After calculating the average values of the temperature data, the temperature data analysis unit 430 identifies, from the temperature sensors 281 to 286, a temperature sensor having the highest average value and a temperature sensor having the lowest average value. In the example shown in FIG. 7, the temperature sensor 284 is identified as a temperature sensor with the highest average value, and the temperature sensor 283 is identified as a temperature sensor with the lowest average value.

Further, the temperature data analysis unit 430 associates each of the temperature sensors 281 to 286 with at least one CPU among the CPUs 211 to 216 using the CPU position information and the temperature sensor position information included in the device information. The association of each of the temperature sensors 281 to 286 with the CPUs 211 to 216 in FIG. 7 corresponds to the layout of the target device 200 in FIG. 2. For example, in the layout of FIG. 2, since the temperature sensor 281 is arranged between the CPU 211 and the CPU 212, the temperature analysis unit 430 associates the temperature sensor 281 with the CPUs 211 and 212.

In the step S570, it is determined whether or not the acquired temperature data is the desired temperature data. The temperature data analysis unit 430 determines whether or not the acquired temperature data is the desired temperature data by comparing a value calculated based on the temperature data with a predetermined value. For example, the temperature data analysis unit 430 confirms whether the difference between the highest average value and the lowest average value of the average values of the temperature data of the temperature sensors 281 to 286 is within a predetermined range. If the difference falls within the predetermined range, the temperature data analysis unit 430 determines that the acquired temperature data is the desired temperature data (YES in the step S570). On the other hand, if the difference does not fall within the predetermined range, the temperature data analysis unit 430 determines that the acquired temperature data is not the desired temperature data (NO in the step S570).

If it is determined that the acquired temperature data is the desired temperature data, it is determined that the allocation of the target programs executed by each of the CPUs 211 to 216 is appropriate. As a result, in the step S580, the temperature data analysis unit 430 determines, as allocation of the target programs, the current allocation of the target programs for which the temperature data has been measured.

If it is determined that the acquired temperature data is not the desired temperature data, processing of changing allocation of the target programs is performed in the step S590. The temperature data analysis unit 430 determines at least one CPU associated with the temperature sensor having the highest average value as the first change target CPU. Further, the temperature data analysis unit 430 determines at least one CPU associated with the temperature sensor having the lowest average value as the second change target CPU.

It is assumed that a CPU having a heavy processing load is located around the temperature sensor having the highest average value. That is, if the number of programs executed by the CPU having the heavy processing load is deceased, the temperature rise around the CPU is suppressed. On the other hand, it is assumed that a CPU having a light processing load is located around the temperature sensor having the highest average value. That is, if the number of programs executed by the CPU having the light processing load is increased, the temperature rise can be made uniform.

The temperature data analysis unit 430 outputs, to the program allocation unit 440, information on the first change target CPU and the second change target CPU as the analysis result of the temperature data.

In the example shown in FIG. 7, the temperature sensor having the highest average value becomes the temperature sensor 284. The CPUs associated with the temperature sensor 284 are the CPUs 212 and 213. Therefore, the CPUs 212 and 213 is notified to the program allocation unit 440 as the first change target CPU.

Further, the temperature sensor having the lowest average value is the temperature sensor 283. The CPUs associated with the temperature sensor 283 are the CPUs 214 and 215. Therefore, the CPUs 214 and 215 is notified to the program allocation unit 440 as the second change target CPU.

For example, it is assumed that the CPUs 211 and 212 are identified as the first change target CPU and the CPUs 211 and 214 are identified as the second change target CPU. The CPU 212 applies to both the first change target CPU and the second change target CPU. In such cases, the CPU 212 may be excluded from of the CPU where the number of target programs executed is to be increased or decreased. That is, the CPU 212 is notified to the program allocation unit 440 as the first change target CPU, and the CPU 214 is notified to the program allocation unit 440 as the second change target CPU.

The program allocation unit 440 reads the target programs for which the temperature data has been measured from the information storage unit 450 and changes the allocation of the target programs to each of the CPUs 211 to 216 based on the analysis result of the temperature data. The allocation of the target programs is changed by changing the allocation of the target programs to the first change target CPU and the second change target CPU.

Specifically, the program allocation unit 440 changes the allocation of the target programs executed by the CPUs 211 to 216, by referring the device information and the target program constraint information and allocating a part of the target programs allocated to the first change target CPU to the second change target CPU.

For example, it is assumed that the CPU 211 is designated as the first change target CPU and the CPU 212 is designated as the second change target CPU. In this case, while referring to the device information and the target program constraint information, the program allocation unit 440 extracts the target program whose allocation can be changed to the CPU 212 among the target programs currently allocated to the CPU 211.

The target program constraint information includes, for example, real-time processing information indicating whether or not the target program is a program that requires real-time performance. The program requiring the real-time performance must be executed by a CPU for real-time processing. Therefore, the program allocation unit 440 confirms whether or not the CPU of the execution destination of the target program can be changed based on the real-time processing information and the CPU type information.

Further, the target program constraint information includes, for example, image processing-related information indicating whether or not the target program is an image processing program. The image processing program is preferably executed by a CPU for parallel processing. Therefore, the program allocation unit 440 confirms whether or not the CPU of the execution destination of the target program can be changed based on the image processing-related information and the CPU type information.

After changing the allocation of the target programs to the CPUs 211 to 216, the program allocation unit 440 compiles the target programs whose allocation has been changed. Further, the program allocation unit 440 stores the target programs whose allocation has been changed in the information storage unit 450. As a result, the target programs stored in the information storage unit 450 is updated to the target programs for which the temperature data is to be measured next time.

The load modules generated by the program allocation unit 440 are downloaded to the internal memory 240 of the target device 200 by the debug control unit 410. Thereafter, the processing returns to the step S520.

As described above, according to the embodiment, the temperature measurement control unit 420 acquires temperature data measured during execution of the target programs. The temperature data analysis unit 430 outputs, as an analysis result of the temperature data, information on at least one CPU where the number of target programs executed is to be decreased and at least one CPU where the number of target programs executed is to be increased. The program allocation unit 440 changes the allocation of the target programs executed by the CPUs 211 to 216 based on the analysis result of the temperature data.

As described above, in the embodiment, the allocation of the target programs is changed based on the measurement result of the temperature of the target device 200. That is, since the allocation of the target programs is changed based on the measurement result of the actual temperature, the allocation of the target programs can be changed considering the operation of circuits other than the CPUs 212 to 216 mounted on the target devices 200. Therefore, it is possible to easily realize the allocation of the target programs in which the temperature is uniformized, as compared with the conventional method, and as a result, it is possible to suppress the increase of the manufacturing cost.

In the embodiment described above, the target device has been described as one, but the present disclosure is not limited thereto. The present disclosure is also applicable to a system that includes a plurality of target devices. In this case, the plurality of target devices is connected to the debug apparatus by a daisy chain. The debug apparatus acquires information about the number of target devices on the system. The debug apparatus can acquire the temperature data of the plurality of target devices by shifting the temperature data output from the plurality of target devices by the number of target devices on the daisy chain.

Further, the control program for executing the processing described in the embodiment may be provided as a program product by recording on a non-transitory computer-readable recording medium such as a magnetic disk, an optical disk, a magnetic-optical disk, and a semiconductor memory. Alternatively, the control program may be provided by recording on a recording medium such as a hard disk built in the computer. The control program can also be provided by downloading via a network.

Although the invention made by the present inventor has been specifically described based on the embodiments, it is needless to say that the present invention is not limited to the above-described embodiments, and various changes may be made without departing from the scope thereof.

What is claimed is:

1. A debug apparatus for debugging target programs including a plurality of programs operating in a semiconductor device including a plurality of Central Processing Units (CPUs) and a plurality of temperature sensors, the debug apparatus comprising:
a processor; and
a memory configured to store a control program, CPU position information, temperature sensor position information, CPU type information, and target program constraint information,
wherein the plurality of CPUs is configured to execute the target programs,
wherein, while the target programs are executed by the plurality of CPUs, the plurality of temperature sensors is configured to measure temperature of the semiconductor device,
wherein the CPU position information comprises information for identifying a position of the plurality of CPUs in the semiconductor device,
wherein the temperature sensors position information comprises information for identifying a position of the plurality of temperature sensors in the semiconductor device,
wherein the CPU type information comprises information for identifying a type of the plurality of CPUs,
wherein the target program constraint information comprises information used in determining whether to change allocation of the target programs executed by the plurality of CPUs,
wherein, when executed by the processor, the control program causes the debug apparatus to:
instruct the semiconductor device to execute the target programs;
acquire a plurality of temperature data measured by the plurality of temperature sensors;
determine, from the plurality of CPUs, at least one CPU where a number of target programs executed is to be decreased, as a first change target CPU and at least one CPU where the number of target programs executed is to be increased, as a second change target CPU, based on the plurality of temperature data, the CPU position information, and the temperature sensor position information; and
change the allocation of the target programs executed by the plurality of CPUs based on the first change target CPU, the second change target CPU, the CPU type information, and the target program constraint information.

2. The debug apparatus according to claim 1, wherein the memory is configured to store measurement time information and sampling time information,
wherein, when executed by the processor, the control program causes the debug apparatus to:
set the measurement time information in a measurement timer;
set the sampling time information in a period timer;
start a count operation of the measurement timer and a count operation of the period timer based on a start of execution of the target programs;
when a count value of the period timer matches a value indicated by the sampling time information and a count value of the measurement timer does not exceed a value indicated by the measurement time information, acquire the plurality of temperature data measured by the plurality of temperature sensors and clear the count value of the period timer to restart the count operation of the period timer; and
when the count value of the period timer matches the value indicated by the sampling time information and the count value of the measurement timer exceeds the value indicated by the measurement time information, stop the count operation of the measurement timer and the count operation of the period timer.

3. The debug apparatus according to claim 1, wherein, when executed by the processor, the control program causes the debug apparatus to:

acquire the plurality of temperature data measured by the plurality of temperature sensors a plurality of times at predetermined sampling intervals;

calculate an average value of the temperature data for each of the plurality of temperature sensors;

identify, from the plurality of temperature sensors, a temperature sensor having a highest average value and a temperature sensor having a lowest average value based on calculation results of the average values of the temperature data;

associate each of the plurality of temperature sensors with at least one CPU among the plurality of CPUs using the CPU position information and the temperature sensor position information;

determine at least one CPU associated with the temperature sensor having the highest average value as the first change target CPU; and determine at least one CPU associated with the temperature sensor having the lowest average value as the second change target CPU.

4. The debug apparatus according to claim 1, wherein, when executed by the processor, the control program causes the debug apparatus to change the allocation of the target programs executed by the plurality of CPUs, by referring the CPU type information, and the target program constraint information and allocating a part of the target programs allocated to the first change target CPU to the second change target CPU.

5. The debug apparatus according to claim 1, wherein, when executed by the processor, the control program causes the debug apparatus to, before instructing the semiconductor device to execute the target programs, instruct the semiconductor device to execute a dummy operation in which the temperature of the semiconductor device is not measured by the plurality of temperature sensors.

6. A debug system comprising:
the debug apparatus according to claim 1; and
the semiconductor device coupled to the debug apparatus,
wherein the semiconductor device comprises a debug interface circuit,
wherein the debug interface circuit comprises a plurality of temperature data storage units and a debug interface control circuit,
wherein the plurality of temperature data storage units is configured to store the plurality of temperature data measured by the plurality of temperature sensors, and
wherein the debug interface control circuit is configured to transmit the plurality of temperature data stored in the plurality of the temperature data storage units to the debug apparatus in response to a read instruction from the debug apparatus.

7. A debug apparatus for debugging target programs including a plurality of programs operating in a semiconductor device including a plurality of Central Processing Units (CPUs) and a plurality of temperature sensors, the debug apparatus comprising:
wherein the plurality of CPUs is configured to execute the target programs,
wherein, while the target programs are executed by the plurality of CPUs, the plurality of temperature sensors is configured to measure temperature of the semiconductor device,
wherein the debug apparatus comprises:
an information storage unit configured to store CPU position information, temperature sensor position information, CPU type information, and target program constraint information;

a debug control unit configured to instruct the semiconductor device to execute the target programs;

a temperature measurement control unit configured to acquire a plurality of temperature data measured by the plurality of temperature sensors;

a temperature data analysis unit configured to determine, from the plurality of CPUs, at least one CPU where a number of target programs executed is to be decreased, as a first change target CPU and at least one CPU where the number of target programs executed is to be increased, as a second change target CPU, based on the plurality of temperature data, the CPU position information, and the temperature sensor position information; and a program allocation unit configured to change allocation of the target programs executed by the plurality of CPUs based on the first change target CPU, the second change target CPU, the CPU type information, and the target program constraint information, wherein the CPU position information comprises information for identifying a position of the plurality of CPUs in the semiconductor device, wherein the temperature sensors position information comprises information for identifying a position of the plurality of temperature sensors in the semiconductor device, wherein the CPU type information comprises information for identifying a type of the plurality of CPUs, and wherein the target program constraint information comprises information used in determining whether to change the allocation of the target programs executed by the plurality of CPUs.

8. The debug apparatus according to claim 7,
wherein the information storage unit is configured to store measurement time information and sampling time information,
wherein the temperature measurement control unit comprises a measurement timer and a period timer,
wherein the temperature measurement control unit is configured to:
set the measurement time information in the measurement timer;
set the sampling time information in the period timer;
start a count operation of the measurement timer and a count operation of the period timer based on a start of execution of the target programs;
when a count value of the period timer matches a value indicated by the sampling time information and a count value of the measurement timer does not exceed a value indicated by the measurement time information, acquire the plurality of temperature data measured by the plurality of temperature sensors and clear the count value of the period timer to restart the count operation of the period timer; and
when the count value of the period timer matches the value indicated by the sampling time information and the count value of the measurement timer exceeds the value indicated by the measurement time information, stop the count operation of the measurement timer and the count operation of the period timer.

9. The debug apparatus according to claim 7,
wherein the temperature measurement control unit is configured to acquire the plurality of temperature data measured by the plurality of temperature sensors a plurality of times at predetermined sampling intervals, and wherein the temperature data analysis unit is configured to:

calculate an average value of the temperature data for each of the plurality of temperature sensors;

identify, from the plurality of temperature sensors, a temperature sensor having a highest average value and a temperature sensor having a lowest average value based on calculation results of the average values of the temperature data;

associate each of the plurality of temperature sensors with at least one CPU among the plurality of CPUs using the CPU position information and the temperature sensor position information;

determine at least one CPU associated with the temperature sensor having the highest average value as the first change target CPU; and determine at least one CPU associated with the temperature sensor having the lowest average value as the second change target CPU.

10. The debug apparatus according to claim 7, wherein the program allocation unit is configured to change the allocation of the target programs executed by the plurality of CPUs, by referring the CPU type information, and the target program constraint information and allocating a part of the target programs allocated to the first change target CPU to the second change target CPU.

11. The debug apparatus according to claim 7, wherein, before instructing the semiconductor device to execute the target programs, the debug control unit is configured to instruct the semiconductor device to execute a dummy operation in which the temperature of the semiconductor device is not measured by the plurality of temperature sensors.

12. A debug system comprising:

the debug apparatus according to claim 7; and the semiconductor device coupled to the debug apparatus, wherein the semiconductor device comprises a debug interface circuit, wherein the debug interface circuit comprises a plurality of temperature data storage units and a debug interface control circuit, wherein the plurality of temperature data storage units is configured to store the plurality of temperature data measured by the plurality of temperature sensors, and wherein the debug interface control circuit is configured to transmit the plurality of temperature data stored in the plurality of the temperature data storage units to the debug apparatus in response to a read instruction from the debug apparatus.

13. A non-transitory computer-readable recording medium that stores a program to be executed in a debug apparatus that includes a processor and a memory, and debugs target programs including a plurality of programs operating in a semiconductor device including a plurality of Central Processing Units (CPUs) and a plurality of temperature sensors, the memory storing CPU position information, temperature sensor position information, CPU type information, and target program constraint information, the plurality of CPUs executing the target programs, the plurality of temperature sensors measuring temperature of the semiconductor device during execution of the target programs, the program performing a method comprising:

instructing the semiconductor device to execute the target programs;

acquiring a plurality of temperature data measured by the plurality of temperature sensors;

determining, from the plurality of CPUs, at least one CPU where a number of target programs executed is to be decreased, as a first change target CPU and at least one CPU where the number of target programs executed is to be increased, as a second change target CPU, based on the plurality of temperature data, the CPU position information, and the temperature sensor position information; and changing allocation of the target programs executed by the plurality of CPUs based on the first change target CPU, the second change target CPU, the CPU type information, and the target program constraint information, wherein the CPU position information comprises information for identifying a position of the plurality of CPUs in the semiconductor device, wherein the temperature sensors position information comprises information for identifying a position of the plurality of temperature sensors in the semiconductor device, wherein the CPU type information comprises information for identifying a type of the plurality of CPUs, and wherein the target program constraint information comprises information used in determining whether to change the allocation of the target programs executed by the plurality of CPUs.

14. The non-transitory computer-readable recording medium according to claim 13, wherein the memory stores measurement time information and sampling time information, and wherein the method further comprises:

setting the measurement time information in a measurement timer;

setting the sampling time information in a period timer;

starting a count operation of the measurement timer and a count operation of the period timer based on a start of execution of the target programs;

when a count value of the period timer matches a value indicated by the sampling time information and a count value of the measurement timer does not exceed a value indicated by the measurement time information, acquiring the plurality of temperature data measured by the plurality of temperature sensors and clearing the count value of the period timer to restart the count operation of the period timer; and when the count value of the period timer matches the value indicated by the sampling time information and the count value of the measurement timer exceeds the value indicated by the measurement time information, stopping the count operation of the measurement timer and the count operation of the period timer.

15. The non-transitory computer-readable recording medium according to claim 13, wherein the method further comprises:

acquiring the plurality of temperature data measured by the plurality of temperature sensors a plurality of times at predetermined sampling intervals;

calculating an average value of the temperature data for each of the plurality of temperature sensors;

identifying, from the plurality of temperature sensors, a temperature sensor having a highest average value and a temperature sensor having a lowest average value based on calculation results of the average values of the temperature data;

associating each of the plurality of temperature sensors with at least one CPU among the plurality of CPUs using the CPU position information and the temperature sensor position information;

determining at least one CPU associated with the temperature sensor having the highest average value as the first change target CPU; and determining at least one CPU associated with the temperature sensor having the lowest average value as the second change target CPU.

16. The non-transitory computer-readable recording medium according to claim 13, wherein the method further comprises changing the allocation of the target programs executed by the plurality of CPUs, by referring the CPU type information, and the target program constraint information and allocating a part of the target programs allocated to the first change target CPU to the second change target CPU.

17. The non-transitory computer-readable recording medium according to claim 13, wherein the method further comprises, before instructing the semiconductor device to execute the target programs, instructing the semiconductor device to execute a dummy operation in which the temperature of the semiconductor device is not measured by the plurality of temperature sensors.

* * * * *